March 10, 1925.
J. W. HALLER
FRUIT CUTTER
Filed May 5, 1924     3 Sheets-Sheet 1
1,529,127
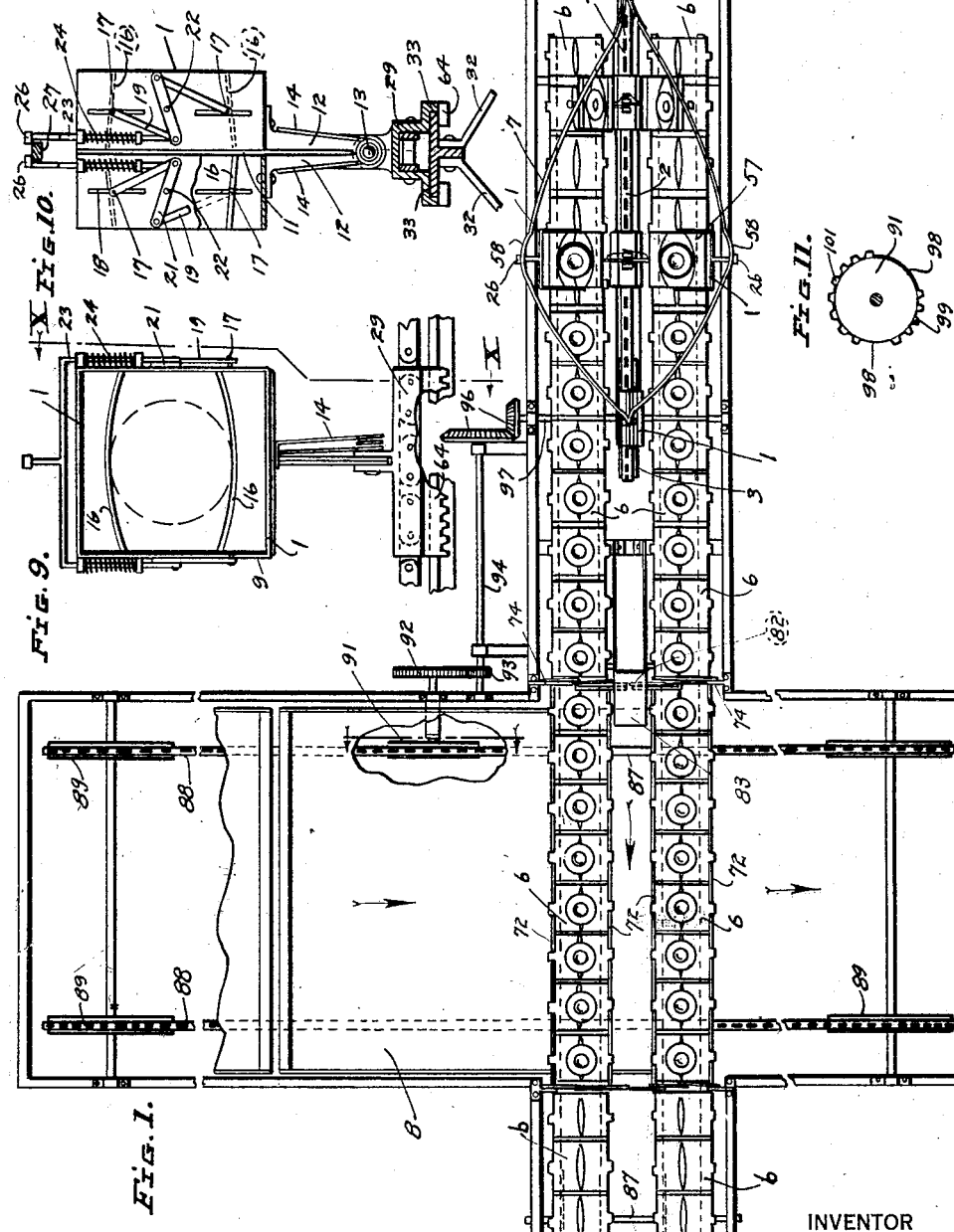
INVENTOR
*JOHN W. HALLER*
BY
ATTORNEYS.

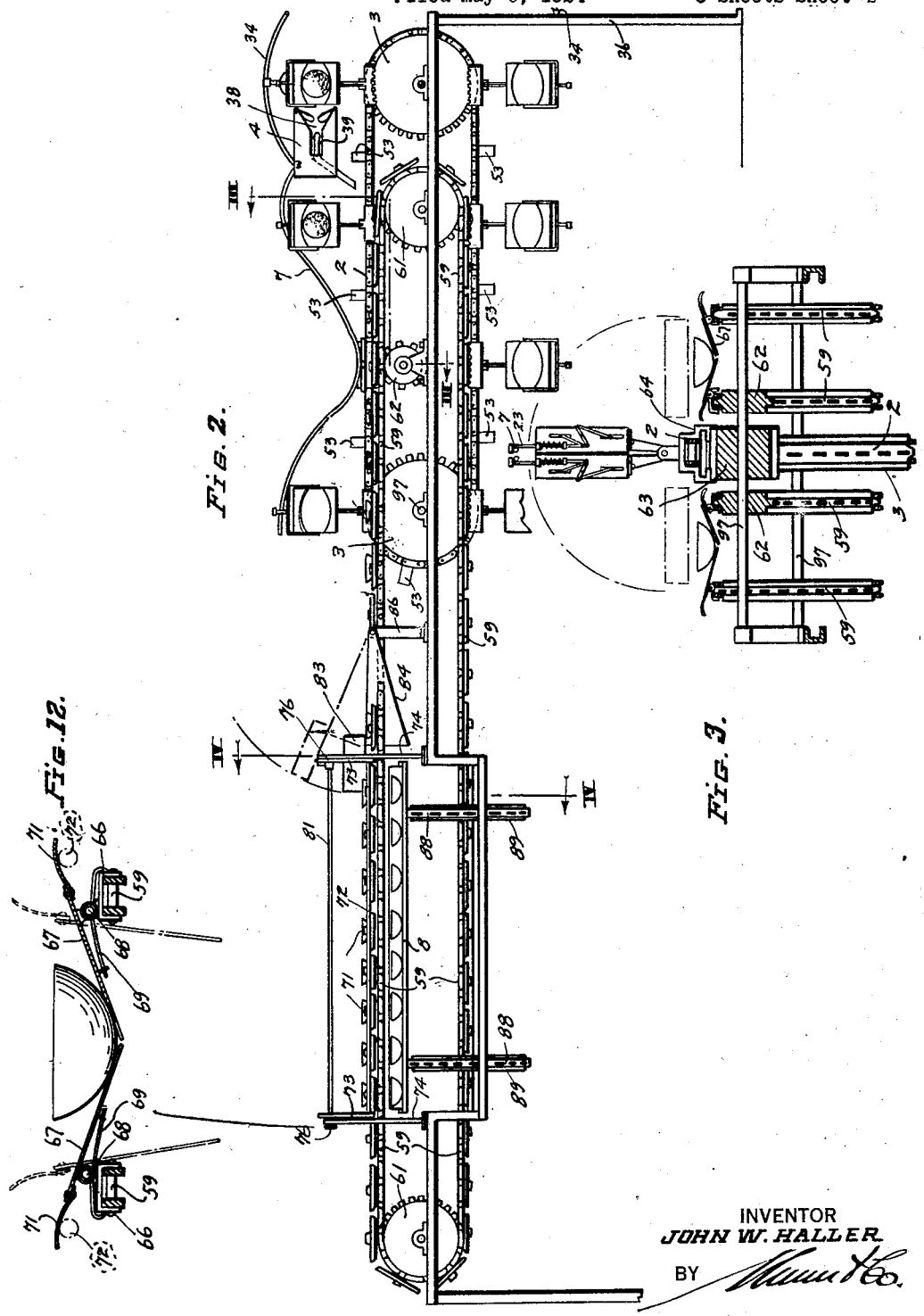

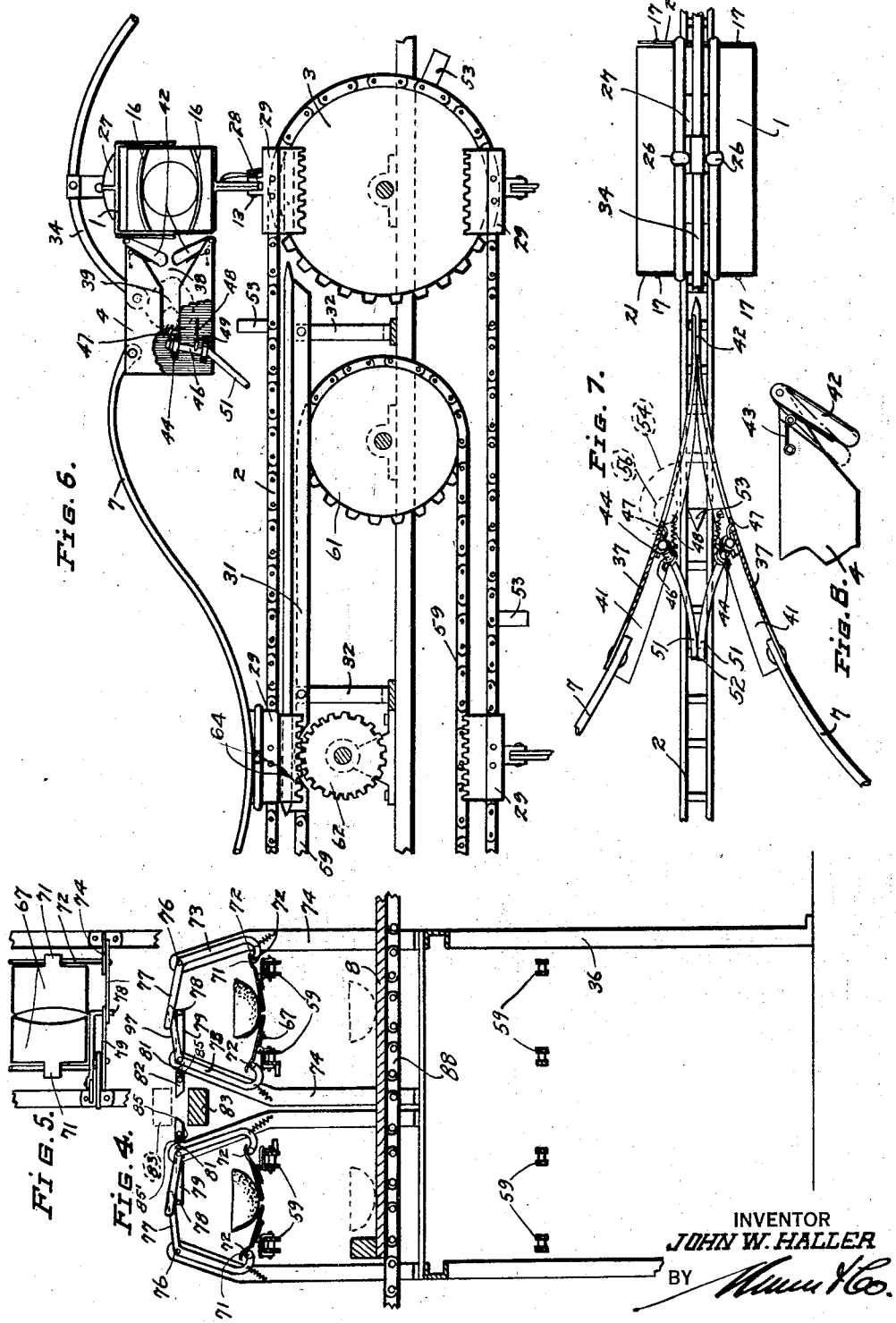

Patented Mar. 10, 1925.

1,529,127

UNITED STATES PATENT OFFICE.

JOHN W. HALLER, OF CRESCENT CITY, CALIFORNIA.

FRUIT CUTTER.

Application filed May 5, 1924. Serial No. 711,156.

*To all whom it may concern:*

Be it known that I, JOHN W. HALLER, a citizen of the United States, and a resident of Crescent City, county of Del Norte, State of California, have invented a new and useful Fruit Cutter, of which the following is a specification.

The present invention relates to improvements in fruit cutting devices and its particular object is to provide a machine that will split any fruit having a single pit or seed, such as peaches or apricots, plums and cherries in halves, will remove the pit from the fruit and place the fruit in proper alinement on the conveyor, which latter delivers two rows simultaneously to a tray moving transversely to the travel of the conveyors. The movements of the trays and the conveyors are so timed that the tray is automatically filled by the machine, and it is only necessary to feed the whole fruit into the machine and to remove the full trays. Further objects and advantages of my device will appear as the specification proceeds.

The preferred form of the invention is illustrated in the accompanying drawings in which Figure 1 shows a top plan view of my device, Figure 2 a side elevation of the same, Figure 3 a transverse section taken along line III—III of Figure 2, Figure 4 a transverse section taken along line IV—IV of Figure 2, Figure 5 a detail view in plan of one of the cups shown in Figure 4, Figure 6 an enlarged detail view in side elevation illustrating the cutting and pit removing device of my machine, Figure 7 a more enlarged detail view in plan of the cutting and pit removing mechanism, Figure 8 a detail view in side elevation illustrating one of the cutting blades of my device, Figure 9 a detail view illustrating in side elevation a cage used for conveying the fruit to the cutting device, Figure 10 an elevation of the cage as viewed from line X—X of Figure 9, Figure 11 a detail view of a mutilated gear wheel used for imparting intermittent motion to a tray receiving the fruit, and Figure 12 an enlarged detail view in end elevation of one of the cups used for conveying the cut fruit to the tray. While I have shown only the preferred form of the invention, I wish to have it understood that various changes or modifications may be made within the scope of the claims hereto attached without departing from the spirit of the invention.

The principal parts of my invention are a plurality of cages (1) mounted for continuous travel on a chain (2) passing over two sprockets (3), a cutting device (4) mounted in the path of the cages and splitting the same and the fruit contained therein into halves, two conveyors (6) mounted on opposite sides of the chain (2), means for spreading the two halves of the cage upon the two conveyors (6) including the guide (7), means for moving a tray (8) transversely to the conveyors, means for dropping the fruit from the conveyors on the tray, and means of advancing the tray in such a manner that it will be filled completely when its end is reached.

The cage (1) consists of a square or rectangular box (9) open on both sides and split longitudinally as shown at (11) into two sections which are hinged together by means of two brackets (12) pivoted to a pin (13). It will be noted that this construction allows the two sections of the box to be separated by means of an object passing through the center of the same, a spring (14) serving to hold the two sections together.

Inside of this box are mounted two clamping members (16) spaced apart sufficiently far to allow the fruit to be handled to be introduced between the same. Both clamping members are preferably arched in side elevation and decline downwardly from the center in end elevation, and both of them are split longitudinally to correspond with the split in the box, so that two registering halves of the clamping members follow one section of the box and the other two halves follow the other section of the box when the latter is split.

The two clamping members have pins (17) extending therefrom, which latter pass through vertical slots (18) in the end walls of the cage, and two corresponding pins in each section are connected by means of links (19) to a lever (21) pivoted as shown at (22) in the center of each section. The inner end of the lever (21) is furthermore connected to a rod (23) which is normally pressed downwardly by means of a spring (24) so that normally the two co-acting clamping members of each section are forced upon a fruit placed inside of the cage.

The two rods (23) terminate in inner projections (26) adapted to ride on a guide (27) which is curved as shown in Figure 6 and forces the two rods (23) upwardly whereby the top and bottom clamping members are separated through the action of the levers (21) so that when the two projections (26) pass over the highest point of the cam guide (27) the cage is wide open and the fruit may be inserted. Immediately thereafter the two clamping members close in on the fruit due to the action of the springs (24).

The pin (13) to which the two sections of the cage are pivoted is supported in lugs (28) extending from a shoe (29) secured to the chain (2) previously referred to. During its travel from one of the sprocket wheels (3) to the other sprocket wheel the shoe (29) is guided by means of a T-shaped member (31) supported in brackets (32) by means of the tongue and groove arrangement (33) shown in Figure 10. The cages are preferably spaced on the chain in such a manner that a considerable number, as for instance eight, as shown in Figure 2, may be manipulated by means of one chain.

Centrally over the chain in close proximity to the first cage there is mounted the cutting device (4) supported preferably by means of a bracket (34) extending from the frame (36) of the machine. The cutting device consists primarily of two blades (37) converging so as to meet in a central vertical line and slotted as shown at (38), the slots being widest at the front end and tapering down to a straight slot (39), which latter is of a size sufficient to accommodate the pit of the fruit to be handled. Since the cage when the same is opened by the cutting device opens on a hinge (13) the blades are inclined instead of being vertical, as shown at (41), so that the two sections of the cage remain in contact with the blades throughout their inner faces.

In front of the blades are pivotally supported two cutting knives (42) with springs (43) forcing the same into the meat of the fruit. It will be understood that as the cage advances the two blades split the cage and the two knives (42) cut through the fruit so as to halve the same, the fruit being preferably placed in the cage with the stem carrying end in front.

The fruit being cut in two, the pit, provided the same does not drop out altogether, must adhere to one of the halves, and whichever half it follows it will be forced into one of the slots (38) and into one of the narrower slots (39) which prevents vertical motion of the pit. Behind each slot there is pivotally supported in each blade (37) in brackets (44) a rod (46) which has a small shovel (47) extending from its upper end into the slot (39) with a spring (48) pulling on an arm (49) serving to force the shovel into the slot.

The two rods (46) have lower extensions (51) disposed at an angle to the rods and meeting centrally over the chain (2) as shown at (52). The chain itself carries a wedge (53) in advance of the cage as shown in Figures 6 and 7, and when this wedge passes the point (52) where the two extensions (51) meet, it forces the same apart and thereby exercises a twisting action upon the rod and the shovel (47) which forces the latter upon the pit and separates the pit from the fruit.

The action may be well understood by referring to Figure 7, where the fruit (54) and the pit (56) are shown in dotted lines in the position occupied after the fruit has been cut in two and advanced sufficiently far for the pit to have entered the slot (39). The spring (48) which serves to force the shovel (47) outwardly causes the latter to go around the adhering face of the pit, while after this motion has been well started the wedge (53) forces the shovel upon pit so that no portion of the meat of the fruit is left to adhere to the pit.

After the two sections of the cage and the two halves of the fruit contained in the two sections have passed the blades (41), the two projections (26) of the rods (27) extending upwardly from the cage engage with the two guides (7) which are formed to further separate the two sections and to gradually swing the same into the horizontal position shown at (57) in Figure 1. Until it reaches a perfectly horizontal position, the guide members (7) do not affect the relative position of the two clamping members (16), but when the horizontal position has been substantially reached, the guides bulge outwardly as shown at (58) which pulls the two rods (23) outwardly and through the action of the lever (21) forces the two clamping members of each section apart so that the two halves of the fruit drop out of the two sections of the cage. As the cage advances further, the guide members are bent to gradually allow the two sections to come together again under the influence of the spring (14).

When the two halves of the fruit drop out of their respective supporting sections, they fall on the two conveyors (6). The latter, which are disposed in spaced and parallel relation, are each made up of two chains (59) traveling over sprocket wheels (61) and intermittently advance by means of pinions (62) mounted coaxially with the pinion (63) which latter is actuated by a rack (64) secured to the under side of the shoe (29) supporting the cage. The shoe is of the same length as one of the cup units of the conveyors, so that each time the cage deposits two halves of a fruit the conveyors are advanced by the length of one cup unit.

The cup units are illustrated in detail in Figures 4 and 5 and in Figure 12, and consist of U-shaped clips (66) secured to the chains (59) and plates (67) supported on pivots (68), which latter plates are supported by means of springs (69) to normally occupy the position indicated in Figure 12 so as to be able to support the halved fruit in the manner illustrated in the drawing.

The outer ends of the plates (67) have lugs (71) extending therefrom, which latter run onto horizontal rods (72) extending the width of the tray. These horizontal rods (72) are supported at each end by levers (73) bent at an angle greater than a right angle at a point near the fulcrum (76) and are hooked at the lower ends so as to allow the unobstructed passage of the lugs onto the horizontal rods (72). The upper extremities (77) of the bent levers extend past each other so as to form shears, the blades to be sufficiently long so as to continually engage the projections (78). These levers are pivoted to standards (74) as shown at (76), one set of these to be affixed at each end of the horizontal rods. The projections (78) engaging the shears (77) are connected through the arms (79) by means of a rocking bar (81) pivoted to the standards (74). The rocking bar is actuated by means of the jointed lever (82) extending into the path of a weight (83). This lever is jointed so as to allow of a free upward movement of the weight (83) when springs (85) affixed to the jointed portion return it to place and shoulders (85') prevent its motion further than a line with the rigid portion.

The latter weight which is formed to present an inclined bottom face (84) is pivoted between two standards (86) and is raised by means of short transverse rods (87) connecting the two chains at distances corresponding to the width of the tray to be filled. As these transverse rods advance they engage the bottom face (84) of the weight and lift the same to the extreme height shown in dotted lines in Figure 2.

After the rod (87) has passed the weight, the latter drops downward and strikes the two free arms (82) of the levers (79) and causes the projections (78) to force the two free arms (77) upwardly so as to cause the rods (72) to lift the outer ends of the plates (67) thereby opening the cups and allowing the fruit to drop on the tray.

The latter moves transversely to the direction of travel of the conveyors and travels on chains (88) passing over sprocket wheels (89). One of the chains (88) is actuated by means of the mutilated sprocket wheel (91) shown in detail in Figure 11, which latter is mounted coaxially with a gear wheel (92) engaged by a pinion (93) on the shaft (94), the latter being driven through two bevel gears (96) from the shaft (97) supporting one of the sprocket wheels (3).

In view of the fact that eight cups (in the example selected) drop their fruit simultaneously to fill a complete row every time, it is necessary that the motion of the tray be made intermittent, and that is the reason for the mutilated gear (91). But it is further necessary to make provision for the fact that the two conveyors dropping their fruit simultaneously are disposed at a distance from one another sufficient to allow of the interposition of an extra row between the two rows dropped by the conveyors. It is necessary therefore to make provision for causing the tray to travel in such a manner that the two conveyors may first drop rows Nos. 1 and 3 then rows Nos. 2 and 4, and thereafter rows Nos. 5 and 7. The intermittent motion of the tray must be timed therefore to alternately cover short and long distances, and for this purpose the mutilated gear (91) is provided between two blank spaces (98) with a few cogs (99) on one side and a larger number of cogs (101) on the other side.

The operation of the machine is as follows:

The operator places fruit into the cages (1) as the latter pass the cam (27) and are automatically opened by the same. The cage with the fruit therein is split by the knives (42) and the blades (37) and the pits are removed by the shovel (47) in the manner previously described.

The two sections of the cage are then spread into a horizontal position by means of the guide (7) and when reaching a definite point are opened by the bulge (58) so that the two halves of the fruit drop on the conveyor cups disposed underneath the same. The latter cups are advanced simultaneously with the cage dropping the fruit by means of the shoe (29) engaging the cog wheel (62) through the rack (64) so that a new set of cups is ready to receive two halves to be delivered by the next cage.

The cups of the conveyor are advanced until they cover the full width of the tray and are then opened simultaneously by means of the weight (83) dropping on the free arms (82) of the levers (79) thereby causing the horizontal rods (72) to lift the outer ends of the plates (67). After the fruit has been dropped the tray is advanced by the mutilated gear (91) either through a short distance to allow the second and the fourth rows to be filled, or through a longer distance to allow the fifth and the seventh rows to be filled.

It is understood of course that different kinds of fruit call for different-sized cages and plates, since each cage can handle a limited range of sizes only and since the plates should be of such size as to place the fruit on the tray in close proximity to one another.

I claim:

1. In a fruit cutter of the character described, a cage open at the sides so as to allow a fruit to be introduced laterally and comprising two sections hinged to one another allowing the cage to be split vertically.

2. In a fruit cutter of the character described, a cage comprising two end walls and top and bottom members confined between the end walls allowing a fruit to be introduced between the same laterally, the whole cage being split longitudinally.

3. In a fruit cutter of the character described, a cage comprising two end walls and top and bottom members confined between the end walls allowing a fruit to be introduced between the same laterally, the whole cage being split longitudinally and the two sections produced by the split being hinged to one another.

4. In a fruit cutter of the character described, an open-sided cage having removable top and bottom elements and being mounted for continuous travel and means for automatically separating the top and bottom elements at predetermined points of the travel for allowing a fruit to be introduced between the two elements.

5. In a fruit cutter of the character described, a cage having movable top and bottom elements, a lever pivoted between the two elements, link connections between the ends of the lever and the two elements and means automatically operating the lever for separating the elements at predetermined times.

6. In a fruit cutter of the character described, a cage mounted for continuous travel having movable top and bottom elements, a lever pivoted between the two elements, link connections between the ends of the lever and the two elements, yielding means operating the lever for urging the two elements toward one another, and guide means operatively connected with the lever automatically operating the same at predetermined times for separating the elements.

7. In a fruit cutter of the character described, a cage mounted for travel adapted to have a fruit confined therein and divided longitudinally, a cutting element having two diverging blades opposing the travel of the cage so as to split the same and the fruit contained therein and to guide the two halves of the fruit along the outer faces of the blade, the blades being formed with slots allowing the pit of the fruit to be guided therein, and a yielding cutting member extending into the slot formed to ride along the outside of the pit for removing the same.

8. In a fruit cutter of the character described, a stationary cutting element having two diverging blades, means for guiding a fruit so as to be halved by the cutting element, the blades being formed with slots arranged to guide the pit of the fruit therein, and a yielding cutting member extending into the slot formed to ride along the outside of the pit for removing the same.

9. In a fruit cutter of the character described, a stationary cutting element having two diverging blades, means for guiding a fruit so as to be halved by the cutting element, the blades being formed with slots arranged to guide the pit of the fruit therein, a yielding cutting member extending into the slot formed to ride along the outside of the pit for removing the same, and means for forcing the cutting member upon the pit.

10. In a fruit cutter of the character described, two conveying elements disposed in spaced and parallel relation, means for mounting a fruit for travel between the two elements, means for halving the fruit during its travel, means for spreading the two halves so as to bring the same over the conveying elements and means for dropping the two halves on the conveying elements.

11. In a fruit cutter of the character described, two conveying elements disposed in spaced and parallel relation, a cage comprising two hinged sections adapted to have a fruit confined therein and mounted for travel between the conveying elements, means for splitting the cage and the fruit contained therein during its travel, guide means for spreading the two sections whereby the same are brought over the two conveying elements and means for dropping the two halves of the fruit on the latter.

12. In a fruit cutter of the character described, two conveying elements disposed in spaced and parallel relation, a cage comprising two hinged sections meeting in a vertical longitudinal plane and top and bottom clamping elements for confining a fruit therein and mounted for travel between the conveying elements, means for splitting the cage and the fruit contained therein during its travel, and guide means for spreading the two sections whereby the same are brought over the conveying elements, the guide means being formed to separate the clamping member thereafter for dropping the two halves of the fruit on the two conveying elements.

13. In a fruit cutter of the character described, two conveying elements mounted for continuous travel in spaced and parallel relation having objects disposed thereon, a tray movable transversely thereto, means for successively dropping rows of objects from the conveying elements on the tray and means for intermittently moving the tray to provide new space for the rows of objects.

14. In a fruit cutter of the character described, two conveying elements mounted for continuous travel in spaced and parallel relation having objects disposed thereon, a tray movable transversely thereto, means for successively dropping rows of objects from the conveying elements on the tray and means for intermittently moving the tray to provide new space for the rows of objects, the intermittent motions being of different length so as to allow second and fourth rows to be placed after the first and third rows and fifth and seventh rows after the second and fourth rows.

15. In a fruit cutter of the character described, a conveying element mounted for continuous travel having objects disposed thereon in row formation, a tray movable transversely thereto, and means for successively dropping entire rows of objects corresponding to the width of the tray on the latter.

16. In a fruit cutter of the character described, a conveying element mounted for continuous travel having objects disposed thereon in row formation, a tray movable transversely thereto, means for successively dropping entire rows of objects corresponding to the width of the tray on the latter, and means for intermittently advancing the tray in timed relation to the dropping of the objects.

17. In a device of the character described, a conveyor comprising two chains disposed in spaced and parallel relation, pairs of plates pivoted to the chains so as to form cups for fruit between the chains, yielding means for holding the plates in an active position and means engaging the outer ends of the plates for tilting the same at predetermined times whereby the fruit is dropped.

JOHN W. HALLER.